United States Patent [19]
Gausmann et al.

[11] Patent Number: 6,009,100
[45] Date of Patent: Dec. 28, 1999

[54] ASYNCHRONOUS TRANSFER MODE SWITCHING SYSTEM

[75] Inventors: Eric John Gausmann; Charles Arthur Witschorik, both of Naperville, Ill.

[73] Assignee: Lucent Technologies Inc., Murray Hill, N.J.

[21] Appl. No.: 08/928,872

[22] Filed: Sep. 12, 1997

[51] Int. Cl.⁶ .................................................. H04L 12/56
[52] U.S. Cl. ........................... 370/397; 370/385; 370/466
[58] Field of Search ................................. 370/352, 353, 370/354, 355, 356, 389, 391, 392, 395, 397, 466, 467, 471, 474, 384, 385; 379/290, 350

[56] References Cited

U.S. PATENT DOCUMENTS

| 5,428,609 | 6/1995 | Eng et al. .................. 370/352 |
|---|---|---|
| 5,737,312 | 4/1998 | Sasagawa .................. 370/232 |
| 5,764,637 | 6/1998 | Nishihara .................. 370/397 |
| 5,784,371 | 7/1998 | Iwai .................. 370/397 |
| 5,809,022 | 9/1998 | Byers et al. .................. 370/395 |

OTHER PUBLICATIONS

Data Communications Computer Networks and Open Systems, Fred Halsall, 1995.

*Primary Examiner*—Dang Ton
*Assistant Examiner*—Ken Vanderpuye

[57] ABSTRACT

An asynchronous transfer mode switching network can be made to look like a synchronous tandem switch to end offices connected to the network by establishing a permanent virtual path through the network that carries information between the end offices. Individual channels to be switched are assigned ATM VCI addresses at both ends that correspond to the time slot channel being sent and a time slot channel being received.

2 Claims, 4 Drawing Sheets

FIG. 1

| 8 | 7 | 6 | 5 | 4 | 3 | 2 | 1 | BYTE OCTET |
|---|---|---|---|---|---|---|---|---|
| GFC (at UNI), VPI (at NNI) | | | | VPI | | | | 1 |
| VPI | | | | VCI | | | | 2 |
| VCI | | | | | | | | 3 |
| VCI | | | | PT | | | CLP | 4 |
| HEC | | | | | | | | 5 |

GFC = GENERIC FLOW CONTROL
VPI = VIRTUAL PATH IDENTIFIER
VCI = VIRTUAL CHANNEL IDENTIFIER
PT = PAYLOAD TYPE
CLP = CELL LOSS PRIORITY
HEC = HEADER ERROR CONTROL

PRIOR ART PVC
200

400

ASYNCHRONOUS TRANSFER MODE SWITCHING SYSTEM

BACKGROUND OF THE INVENTION

1. Field of the Invention

The present invention relates generally to communication systems and communication networks. In particular, the present invention relates to asynchronous transfer mode communication networks and other communication networks that support virtual paths and virtual channels.

2. Description of the Prior Art

Many of the telecommunication networks in use today are synchronous digital networks. Digitized voice and other digital communications signals are transmitted synchronously (clocked) across these networks at a fixed rate, 1.544 million bits per second for instance. When they are used to carry only voice signals, synchronous networks work quite well. Discrete time periods known as time slots are packed with the digital information for a particular call. Digital information for many calls is sequentially packed together, forming what is known in the art as a time division multiplexed (TDM) data stream, and transmitted serially, in the same sequence such that when the serial bit stream is recovered at a destination, the digital information in the discrete time intervals is extracted and used to reconstruct the original signal.

Currently, voice, data and/or video are generally carried on separate networks each having capabilities that permit the transmission of these signals. In addition, high-rate digital signals are difficult to switch through current synchronous networks; they might require the concatenation of multiple 64 kilobit signal streams for example and be carried on separate communications networks that are capable of switching high-rate data.

A relatively new technology known as asynchronous transfer mode switching, or ATM, provides a method by which voice, data, video, or other information, (hereafter "data") at differing data rates, can be carried on a single network.

Asynchronous transfer mode is exactly what its name suggests: it's asynchronous. Packets of information, also known as ATM "cells" comprised of 53, 8-bit bytes that can represent video, audio, data or other information, are switched at high speeds through asynchronous transfer mode switches, asynchronously with respect to other cells. The first 5 bytes of an ATM cell contain address and other information used to route the ATM cell to a destination and is known as a header. By convention, particular bytes of the 5-byte header are designated to contain predetermined types of information. FIG. 1 is a chart showing the structure of an ATM cell header block. In general, an ATM cell header block comprises at least two addresses: a VCI address and a VPI address. The address fields of the 5-byte header are used by ATM switches to route an ATM cell to a desired destination, i.e., the intended recipient of the remaining 48 bytes of the ATM cell.

The 48 bytes of an ATM cell following the header carry information of interest, such as video and audio. While the individual bits that make up the 53 bytes of an ATM cell are synchronous with respect to each other, thereby permitting information recovery therefrom, ATM cells are asynchronous with respect to each other. ATM transmission rates are also typically much higher that most synchronous networks, thus an ATM network can accommodate a variety of different-rate data sources by blending ATM cells from a variety of data sources into an ATM network.

Today, ATM switching networks consisting of ATM switches linked together through various transmission media such as fiber optic cable, coax, or twisted wire pairs, receive incoming ATM cells and re-send or re-transmit ATM cells to other ATM switches. ATM switches use the VPI and VCI addresses and other information in the header, (as shown in FIG. 1) to route incoming ATM cells to appropriate outbound channels that direct the ATM cell to its intended destination. In the process of switching an ATM cell, an ATM switch can rewrite the 5-byte header block with new VPI and VCI data. The newly written 5-byte header is used by subsequent ATM switches to route the cell through to other ATM switches or to an end office where an asynchronous-to-synchronous converter (also known as a SAC) coupling an end office to the ATM network can convert the information in the 48-byte information block to the signal or information of interest, e.g., a video conference image or voice of a telephone call. ATM switches coupled together can effectively route calls anywhere if the switches are programmed (provisioned) to know where incoming ATM cells that come in to a switch are supposed to go to and how the outgoing ATM cells are to be addressed for the next ATM switch.

As set forth above, data transfer rates of ATM networks are typically much higher than on synchronous networks giving an advantage to an ATM network when the information to be switched is high rate, such as digitized video. While ATM networks can handle varying data rate information sources and have a speed advantage over synchronous networks, ATM switches in a network that are carrying a signal from a source to a destination must all be programmed to route cells correctly through the network. This programming creates an operating overhead that takes the form of programming to each switch.

FIG. 2 shows a block diagram of a prior art asynchronous transfer mode switching network (200) known as a "permanent virtual circuit" network (200) or "PVC" the purpose of which is to route a call from a first end office (202) to a second end office (204). Such a connection would be required for a typical phone call. End office switch 202 is a telephone end office into which telephone calls are received from end users or customers of the phone company and from which time-division-multiplexed trunk groups (218) carry synchronously encoded digital information destined to another end office 204. End office 204 typically has other customers or telephones connected to it.

In the PVC network (200) shown in FIG. 2, a path or route is set up, maintained, and exists for every possible end office 204 that end office 202 can be connected to by programming intervening ATM switches (214, 215, 216 and 217) with information needed by each switch to enable it to "know" where incoming information is coming from and where to route it to. A problem with the PVC networks (200) shown in FIG. 2 is that they require infrastructures in the form of physical trunks to exist between each and every end office and an ATM switch. Those skilled in the art will recognize that to an end office (202) switch, a PVC network (200) looks like direct connections to other switches. Each trunk that originates from an end office is routed through ATM switches (214 and 216) using paths that are set up (provisioned) and which are infrequently changed. In implementation, reference numeral 218 identifies multiple trunk groups, each one of which typically carries synchronous communication signals destined to a different end office switch.

In order to be switched through an ATM network, synchronous signals on the trunk groups 218 must be converted to an asynchronous transfer mode format which is the function of the synchronous to asynchronous converter, or SAC, (210). The synchronous-to-asynchronous converter (210) receives synchronous information and assembles blocks of asynchronous transfer mode information, each of which has a header block appended to it that is an address that routes the cell across at least one ATM switch (214) toward a destination ATM switch (216). It is also well-known in the art that the information in the 5-byte ATM cell header block typically gets the cell across only one switch (214), the traversal of which by the cell is accompanied by new data being written into the header. In the permanent virtual circuit shown in FIG. 2, a permanent path is set up through particular switches and channels thereof. The synchronous-to-asynchronous converter (210) converts the synchronous information to an ATM cell and in the process, effectively maps the destination of the formerly synchronous information of each trunk of trunk groups (218) to a particular end office on a trunk-by-trunk and switch-by-switch basis by way of the information it programs or writes into the 5-byte header it creates for ATM cells it formats.

The output of the SAC (210) is a plurality of asynchronous transfer mode cells or packets each of which is 53 bytes in length. As set forth above, the first five bytes being effectively the address of the destination, the following 48 bytes being the information from the customer or source coupled to the originating end office switch (202). ATM cells or packets from a particular trunk in trunk group 218 destined to a particular office, are addressed with the effective address of an ATM switch (216) to which the packets are sent. This second ATM switch (216) routes the ATM cell to the appropriate end office through an asynchronous-to-synchronous converter (212) that is coupled to the destination end office (204) for the information originating at the sending end office (202).

FIG. 1 shows the format of an ATM header block. It contains an address that effectively identifies an ATM switch to which the packet is to be sent as well as other routing information necessary to route the cell through the network (221) shown in FIG. 2. Each ATM switch (214 and 216) in the network (221) includes tables that are each preprogrammed with information necessary for the switches (214 and 216) to resend ATM cells rewritten with address data required to route the cells through the next switch in the network (221).

The ATM switches shown in FIG. 2 (214 and 216) are well-known ATM permanent virtual circuit switches (ATM-PVC). Each of these switches themselves have addresses for ATM cells addressed to them; decode address information in the ATM header cells and route ATM cells to an asynchronous-to-synchronous converter (212) the function of which is to recreate a time division multiplexed signal, i.e., a synchronous signal from the asynchronous ATM cell. The terminating end SAC (212) reconstructs the synchronous time division multiplexed (TDM) data stream originally output from the end office switch 202. End office switch 204 receives synchronous TDM information from the asynchronous-to-synchronous converter (212) (also known as a synchronous-to-asynchronous converter or SAC) and routes the call to the appropriate end user using signaling information (228) it receives from the originating end office signaling transfer point or STP (206) and its own local STP (208) when the call is first set up.

The embodiment shown in FIG. 2 generally switches calls through the asynchronous transfer mode network 221 at a relatively high speed because each route from an end office switch 202 to an end office switch 204 is established and, as is known in the art, is pre-provisioned. The connection between an end office switch 202 and 204 is established with signaling information for the call between the two end offices (202 and 204) being carried on an interoffice signaling network comprising in part signaling transfer points or STPs 206 and 208.

A drawback of the architecture of the embodiment shown in FIG. 2 is the need to have a network connection for each possible connection that an end office (202) may have to other end offices (204). In urban environments, for example, where there may be numerous end office switches, there must be a trunk group (218), a synchronous-to-asynchronous converter (210), an asynchronous-to-synchronous converter (212) for every conceivable end office to end office connection that is possible.

An alternate embodiment for asynchronous transfer mode switching is shown in FIG. 3 known as switched virtual circuit or SVC (300). In FIG. 3 a network (301) of asynchronous transfer mode switches (306, 308, 309) perform the switching and routing of ATM cells that originate from the synchronous to asynchronous converters (314) coupled to the end office switches 302. Stated alternatively, the end office switch 302 has a single trunk group (310) coupled to a synchronous-to-asynchronous converter (314).

The synchronous-to-asynchronous converter, i.e., SAC (314) assigns VPI and VCI addresses to ATM cells it assembles based upon signaling information received from the narrow-band to broad-band signaling interface circuit (324), which receives signaling information from the originating end office (302). These VPI and VCI addresses are used to route the cells to only the next ATM switch (306) in the ATM network (301) that receives the ATM cells from the SAC (314). The identity of the particular ATM switch in the ATM network (301) to receive ATM cells carrying the call from the SAC (314) is also established by the narrow-band to broad-band signaling interface circuit (324). The ATM switch in the ATM network that receives ATM cells from the SAC (314) decodes the VPI and VCI addresses and switches the cells out to another ATM switch after rewriting the VPI and VCI addresses again. VPI and VCI addresses assigned by subsequent ATM switches in the network (301) that route the ATM cells through the network, are established using signaling information from the originating end office that is sent to the narrow-band to broad-band signaling interface circuit (324), when the call is first set up. The narrow-band to broad-band signaling interface circuit (324) sends a broad-band signaling message to the first switch (306) of the network (301) to set up the call across the network (301). The last switch (308) in the network (301) to route the call then sends another broad-band signaling message to the narrow-band to broad-band signaling interface circuit, NB-BB interface circuit (326) for the destination end office (304). Upon the reception of the broad band signaling message from this last switch (308) the NB-BB interface circuit (326) formats a narrow band signaling message and picks an available time slot that can be constructed by the local SAC (316) and sends an appropriate narrow band signaling message to the destination end office (304) that identifies the time slot from the SAC (316) where the call from the originating end office (302) can be located.

In operation, the ATM cells are assigned new addresses by switches they are routed through. This routing information with the signaling information on the interoffice signaling channel (326, 324, 328) allows ATM cells to be properly routed through the SVC network of FIG. 3.

A problem with the embodiment shown in FIG. 3 is that for a particular call to be routed between end office switch 302 and end office switch 304, a path must be established through each ATM switch as the call set up progresses through the network. Accordingly, the call setup time from end to end for the embodiment shown in FIG. 3 exceeds that for the embodiment shown in FIG. 2 and varies as a function of the number of ATM switches traversed from one end of the network shown in FIG. 3 (300) to the other. On the other hand, for the embodiment shown in FIG. 3, the infrastructure overhead comprising the trunk groups 310 and 312 is reduced because each end office must be coupled only to a synchronous-to-asynchronous and an asynchronous-to-synchronous converter which are then coupled to the asynchronous transfer mode switching network.

An advantage of the embodiment shown in FIG. 2 is that the call setup time is reduced at the expense of communication media or infrastructure. An advantage of the embodiment shown in FIG. 3 is that the infrastructure is reduced but the call setup time is increased.

An asynchronous transfer mode communication network that combines the advantages of the architectures shown in FIG. 2 and FIG. 3 without the disadvantages of either would be an improvement over the prior art.

An object of the invention is to provide an asynchronous transfer mode communications network having minimized call setup time and minimized telecommunications infrastructure.

SUMMARY OF THE INVENTION

Once an ATM PVC path is set up through an ATM switching network, signaling information from an originating end office coupled to the ATM switching network is used to map time-slot-based synchronous information for a call that comes into an end office into ATM cells that are programmed with VCI addresses chosen to identify the particular time slot carrying the call. Signaling information sent to the destination end, that a call is to be routed to the destination end office, triggers an allocation of an unused time slot coming into the destination end office. The destination end office recovers information from the time slot. Signaling information from the originating end office is used to route the call to the appropriate destination.

BRIEF DESCRIPTION OF THE DRAWINGS

The advantageous features of the invention will be explained in greater detail and others will be made apparent from the detailed description of the present invention which is given with reference to the several figures of the drawings, in which:

FIG. 1 shows the format of an ATM header block;

DETAILED DESCRIPTION OF THE PREFERRED EMBODIMENT

Figure 2:
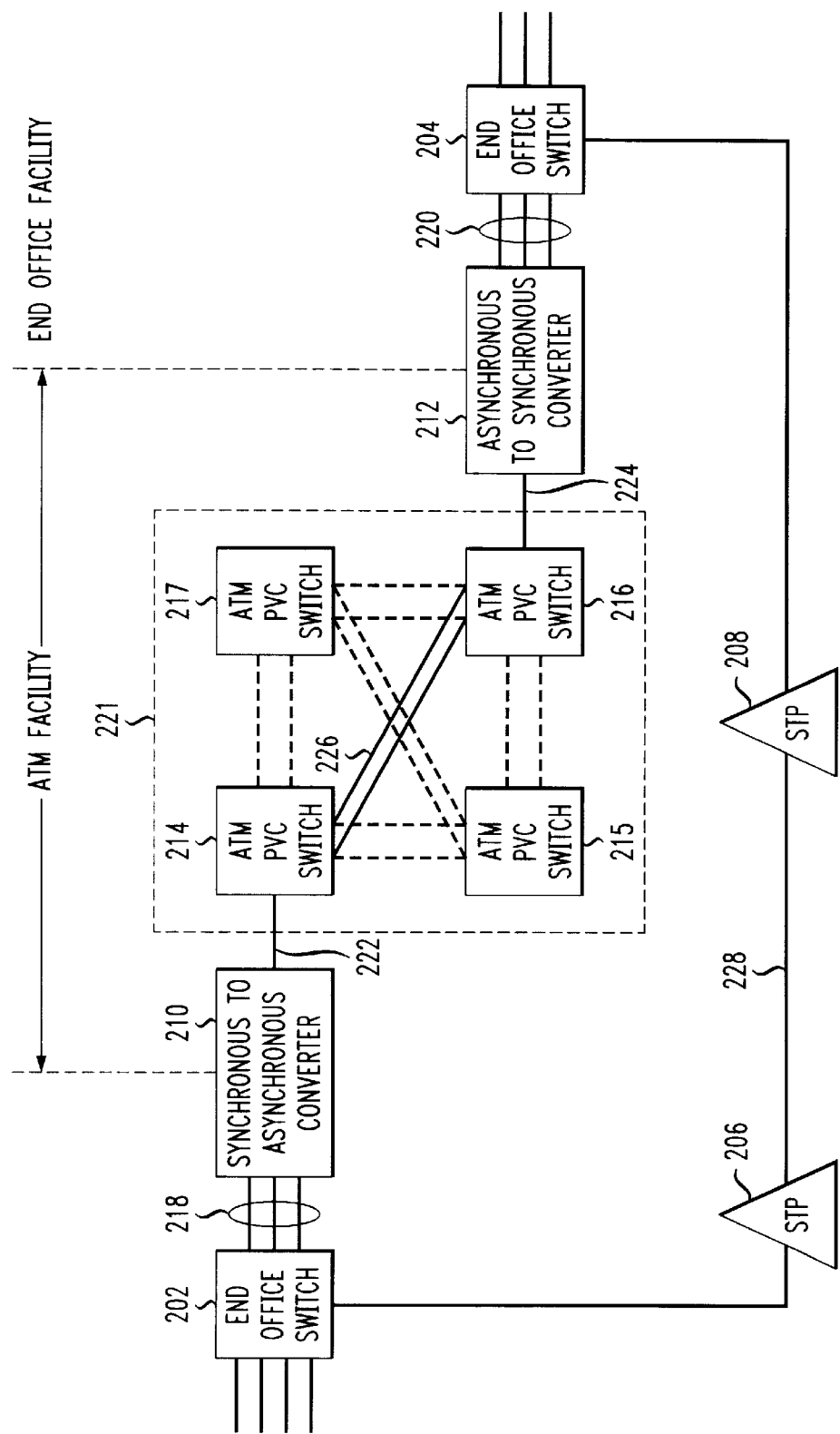
FIG. 2 shows a block diagram of a prior art asynchronous transfer mode switching network for routing a call from a first end office to a second end office.
Figure 3:
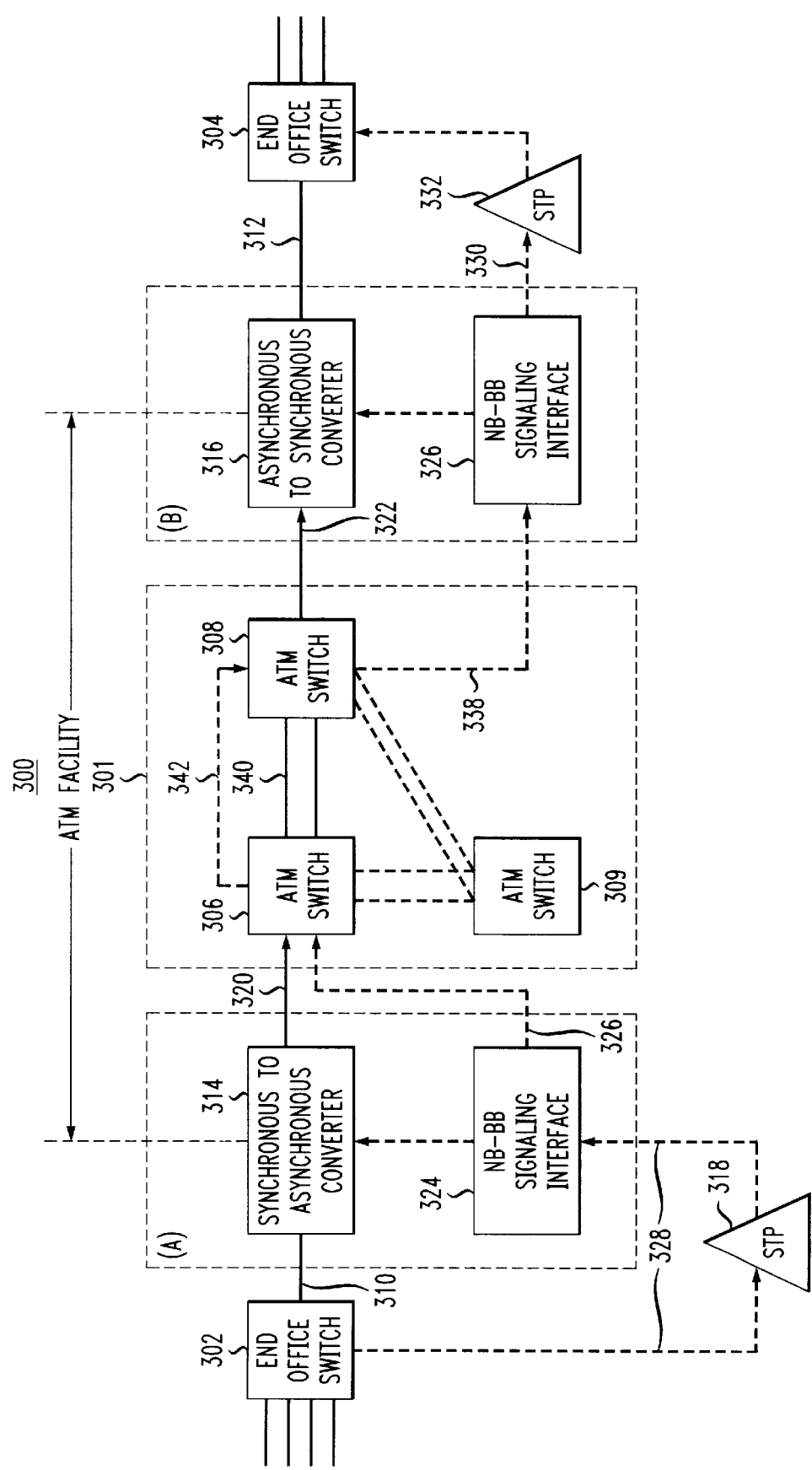
FIG. 3 shows an alternate embodiment for asynchronous transfer mode switching.
Figure 4:
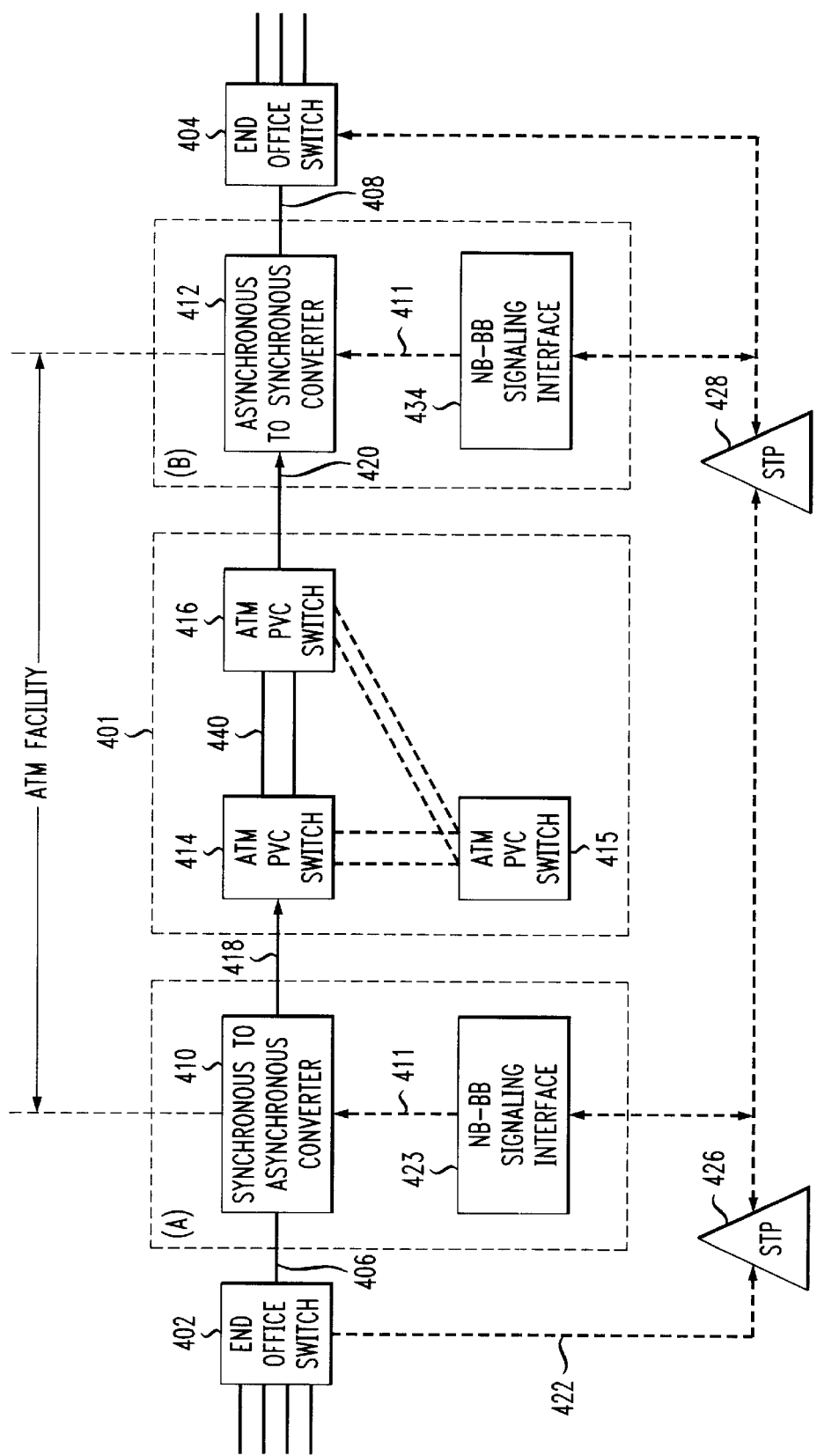
FIG. 4 shows ATM switching of the network pre-provisioned (programmed) to establish permanent virtual paths through the network.

Referring to FIG. 4, ATM switches of a network (400) are pre-provisioned (programmed) to establish permanent virtual paths through the network. The virtual path through an ATM network minimizes call set-up time.

When a call comes into an end office (402) to be routed through the ATM network (401) to a destination end office (404), time division multiplexed synchronous data is formatted into an ATM cell and assigned a VPI address to route the cell through the ATM network (401). Signaling information, including the called number, is routed to a signaling transfer point or STP (426) for delivery to a synchronous-to-asynchronous converter circuit, SAC (410) and NB-BB signaling interface circuit (423) for the originating end office (402).

The NB-BB interface circuit (423) analyzes the called number and determines the end point for ATM cells switched through the network (401). The NB-BB interface circuit (423) determines a PVC path through the ATM network (401), identifying a VPI address that will route cells through the network (401). The VPI address can be thought of as a destination address in that it routes cells through the network to a destination effectively identified by the VPI address.

After having picked an appropriate VPI, the NB-BB interface circuit (423) picks a VCI value to be inserted into the ATM header block of ATM cells being formatted by the originating end SAC (410). The VCI is chosen using a busy/idle list maintained by the NB-BB interface circuit (423). The VCI effectively identifies the ATM cells carrying the synchronous time division multiplexed information which comprises the call.

Once a VCI is identified, a new signaling message is sent to a signaling transfer point (428) for the NB-BB interface circuit (434) and SAC (412) for the destination end office (404). The NB-BB interface circuit (434) acknowledges the VCI address assignment by the sending end NB-BB signaling interface circuit (423).

The NB-BB signaling interface circuit (434) picks a time slot on trunk group 408 that is not being used. A narrow band signaling message is sent by the NB-BB interface circuit (434) to the destination end office (404) that identifies the time slot on trunk group 408 that will carry the call coming into the originating end office (402). End office 404 acknowledges the time slot assignment by the NB-BB signaling interface circuit (434) and thereafter begins mapping incoming data in that time slot and routes recovered information therefrom to an appropriate destination.

Signaling information exchanged between the two end offices and corresponding NB-BB signaling interface circuits and SACs allows the sending office to transfer synchronous data to a SAC, as if the SAC were a tandem switch. A SAC at the receiving, or destination end, recovers the ATM cells, and reconstructs a synchronous signal assigning the data of interest a channel time slot which the receiving end office knows how to route to the proper destination by virtue of the signaling information from the originating end.

VCI addresses are assigned by the NB-BB interface circuit (423) on a call-by-call basis. The NB-BB signaling interface (423) instructs the SAC (410) to use particular VPI and VCI values necessary to route the ATM cells carrying information from a particular time slot, through the ATM network to the destination SAC (412). Instructions from the NB-BB interface circuit (423) to the SAC (410) occur via any appropriate communication channel (411). While the NB-BB interface circuit 423 is sending instructions to its SAC (410), analogous instructions are being sent between the NB-BB interface circuit 434 and SAC 412 via any appropriate communication channel (411).

VCI addresses may be rewritten as cells progress through the network subject to the requirement that when the ATM cells arrive at the intended destination and are to be converted back to synchronous data, the VCI address assigned by the sending-end SAC are reassigned to the cells by the time they arrive at the receiving end. The asynchronous-to-synchronous converter (412) reconstructs the originally synchronous signal and assigns it to a channel on trunk group 408 that was established at call set up.

The ATM switches that could be used to practice the invention include any ATM switch that provides PVC switching. One such switch is the Lucent Technologies Globeview switch. Signaling transfer points that could be used to practice the invention are generally available in the public switched network and include Lucent Techologies STPs. Synchronous-to-asynchronous converters that could be used to practice the invention need to be able to accept VPI and VCI address programming in real time. The NB-BB interface circuit needs to convert a narrow-band signaling signal, e.g. ISUP, to for example BISUP and to program the SAC in real time. The NB-BB interface circuit also needs to be able to determine ATM cell routing through an ATM network and to be able to determine an end office destination from ATM cell addresses and signaling information from the originating end office.

What is claimed is:

1. In a telephone network comprising a plurality of end office switches, each end office switch sending and receiving time division multiplexed communication signals each comprising a plurality of time division multiplexed data channels, an asynchronous transfer mode (ATM) switching network for switching asynchronous transfer mode information between said plurality of end office switches through a permanent virtual circuit (PVC) switch, said information passing through said ATM PVC switch by means of address information appended to blocks of digital information, a method of routing TDM information from a first end office to a second end office switch comprising the following steps:

a) establishing at least one predetermined permanent virtual path (PVP) through said ATM switching network, said PVP extending between an input port of said ATM switching network and an output port of said ATM switching network, ATM information being transferred through said ATM switching network from said input port to said output port;

b) receiving from said first end office switch, synchronous time division multiplexed (TDM) information at a first synchronous-to-asynchronous converter (SAC), said first SAC having an input coupled to said first end office switch and an output coupled to said input port of said ATM switching network, said SAC also receiving signaling information for said TDM information from said first end office switch, said signaling information providing call address information used to identify a terminating asynchronous to synchronous converter (ASC) and said PVP, which couples said first SAC to said ASC;

c) within said first SAC, converting said synchronous time division multiplexed information to an asynchronous transfer mode (ATM) information cell (an ATM cell) having VPI and VCI addresses fields into which VPI and VCI address data is inserted respectively;

d) within said SAC, identifying said terminating ASC and identifying and assigning a VPI address into said VPI address field, said terminating ASC identification and said VPI address being obtained by processing call address information in said TDM signaling information received from said first end office switch;

e) within said SAC, choosing a free VCI address from a VCI address list and assigning said VCI address into said VCI address field of said ATM cell and communicating said VCI address to said terminating ASC along with said TDM signaling information received from said first end office switch and updating said VCI address list;

f) routing said ATM cell from said output port of said first SAC to said input port of said ATM network and thereafter routing said ATM cell through said PVP using said VPI and VCI addresses to said output port of said ATM switching network;

g) receiving at a first asynchronous-to-synchronous converter (ASC), having an input coupled to said output port of said ATM switching network and having an output coupled to said second end office switch, said ATM cell of information to be routed to said second end office, said ASC also receiving TDM signaling information and said VCI address from said SAC;

h) converting said ATM cell of information received at said ASC to a synchronous time division multiplexed signal and constructing therefrom to a time division multiplexed signal the destination of which is addressed to said second office switch using said VCI address received from said SAC; whereby synchronous information from said first end office is carried over said asynchronous transfer mode network and reassembled into a synchronous signal at said second end office.

2. A communications switching network for switching synchronous information between first and second synchronous switches through an asynchronous network comprised of:

a first end office switch from which synchronous information originates;

a second end office switch to which synchronous information is to be transferred;

a first synchronous to asynchronous converter having an input coupled to said first end office switch and having an output, said first synchronous to asynchronous converter receiving synchronous information from said first end office switch comprised of a plurality of time multiplexed channels of information and compiling and forming therefrom asynchronous transfer mode (ATM) cells, each ATM cell having VPI and VCI addresses in VPI and VCI address fields in an ATM cell header block, said first synchronous to asynchronous converter assigning a VPI address value using signaling information from said first end office switch;

a first asynchronous transfer mode (ATM) switch having an input coupled to receive ATM cells from said synchronous to asynchronous converter, said first ATM switch having an output coupled to the input of a second ATM switch said second ATM switch having an output, said first and second asynchronous transfer mode switches included as part of a permanent virtual switch network and being provisioned to provide a permanent virtual asynchronous transfer mode switched path between said first end office and a second end office using information in said VPI address field; and a first asynchronous-to-synchronous converter coupled to the output of said second ATM switch and receiving said ATM cells and reconstructing therefrom a particular time multiplexed channel of information from said asynchronous transfer mode cells from said information in said VCI address field.

* * * * *